US006454309B1

(12) United States Patent
Weh et al.

(10) Patent No.: US 6,454,309 B1
(45) Date of Patent: Sep. 24, 2002

(54) CONNECTOR ADAPTER, ESPECIALLY FOR QUICK TEST CONNECTORS

(76) Inventors: Erwin Weh, Siemensstrasse 5, 89257 Illertissen (DE); Wolfgang Weh, Siemensstrasse 5, 89257 Illertissen (DE)

( * ) Notice: Subject to any disclaimer, the term of this patent is extended or adjusted under 35 U.S.C. 154(b) by 0 days.

(21) Appl. No.: 09/554,287

(22) PCT Filed: Nov. 10, 1998

(86) PCT No.: PCT/EP98/07184

§ 371 (c)(1), (2), (4) Date: Jul. 26, 2000

(87) PCT Pub. No.: WO99/24754

PCT Pub. Date: May 20, 1999

(30) Foreign Application Priority Data

Nov. 10, 1997 (DE) .................................... 297 19 856 U

(51) Int. Cl.[7] ................................................ F16L 35/00

(52) U.S. Cl. ......................... 285/18; 285/101; 285/900; 285/920; 285/306

(58) Field of Search .......................... 285/900, 18, 101, 285/102, 103, 106, 306, 920

(56) References Cited

U.S. PATENT DOCUMENTS

| | | | | | |
|---|---|---|---|---|---|
| 3,216,466 | A | * | 11/1965 | Simko | 141/226 |
| 4,076,278 | A | * | 2/1978 | Chateau et al. | 285/18 |
| 4,577,833 | A | * | 3/1986 | Bormioli | 251/149.1 |
| 5,607,250 | A | * | 3/1997 | Tatterson et al. | 403/325 |

* cited by examiner

*Primary Examiner*—Lynne H. Browne
*Assistant Examiner*—Aaron Dunwoody
(74) *Attorney, Agent, or Firm*—Knobbe Martens Olson & Bear LLP

(57) ABSTRACT

A connector adapter includes an embracing holder and a connector piston. The connector piston sleeve is axially movable relative to the embracing holder by an actuating device and bears against a mating connector in sealed manner in a connected position. A backing plate supports the mating connector and is interchangeably attached to the connector adapter.

15 Claims, 4 Drawing Sheets

CONNECTOR ADAPTER, ESPECIALLY FOR QUICK TEST CONNECTORS

FIELD OF THE INVENTION

This invention relates to a connector adapter, especially for quick test connectors, with an embracing holder like a clamp and a connector piston sleeve, which is axially movable relative to the embracing holder by means of an actuating device and bears against a mating connector in sealed manned in the connected position.

BACKGROUND OF THE INVENTION

Such a connector adapter in the form of a filling connector for gas cylinder valves is known from DE U 91 15 142. The quick connector consists of a cylindrical housing which has a filling inlet with a filling hose at one end, while a valve attachment holder is formed at the other end of the housing, having a valve introduction opening into a receiving space. In plan view the embracing holder has the form of a C-shaped retaining clamp, so that the connector adapter can be fitted sideways on to the valve. An adjusting screw is also provided in the region of the engagement end, so that the size of the valve receiving space can be varied to match the current mating connector.

Although this filling connector has basically proved itself, the ability to use it as a test connector is limited, since this frequently has to be attached for test purposes to a number of different mating connectors, e.g., union nuts in gas lines, so-called eye unions in hydraulic lines, flanged brake lines or valves.

SUMMARY OF THE INVENTION

Accordingly the invention is based on the object of improving a connector adapter of the kind initially specified in relation to its variable use and its simpler construction. In addition the connector adapter is to be as compact as possible and easy to attach.

An aspect of the invention involves a connector adapter having an embracing holder, a connector piston sleeve and a backing plate which supports the mating connector and is attached to the connector adapter. The connector piston sleeve is axially movable relative to the embracing holder by means of an actuating device and bears against a mating connector in sealed manner in a connected position.

By supporting the mating connector on an interchangeable backing plate, the connector adapter can be used for a plurality of different connectors by simply exchanging the backing plate. In addition these are simple components, so that the proposed connector adapter can be implemented very inexpensively, without having to make a complete, separate test apparatus for each mating connector. In particular, the attachment to different hose connectors can be facilitated by the sideways fitting on movement. Furthermore it is advantageous that the mating connector is supported on all sides in the embracing holder, with its closed, frame-like formation, especially with two, three or four fixing screws for the backing plate, whereby the backing plate and if desired the front end of the connector piston can easily be adapted to the current mating connector.

It should particularly be noted that, through the backing plate, the embracing holder fixing the mating connector surrounds it on all sides (apart from the insertion slot) so that the connector adapter overall has a very compact and stable construction.

BRIEF DESCRIPTION OF THE DRAWINGS

Several embodiments will be described and explained in more detail below with reference to the drawings, in which.

DETAILED DESCRIPTION OF THE INVENTION

Figure 1A:
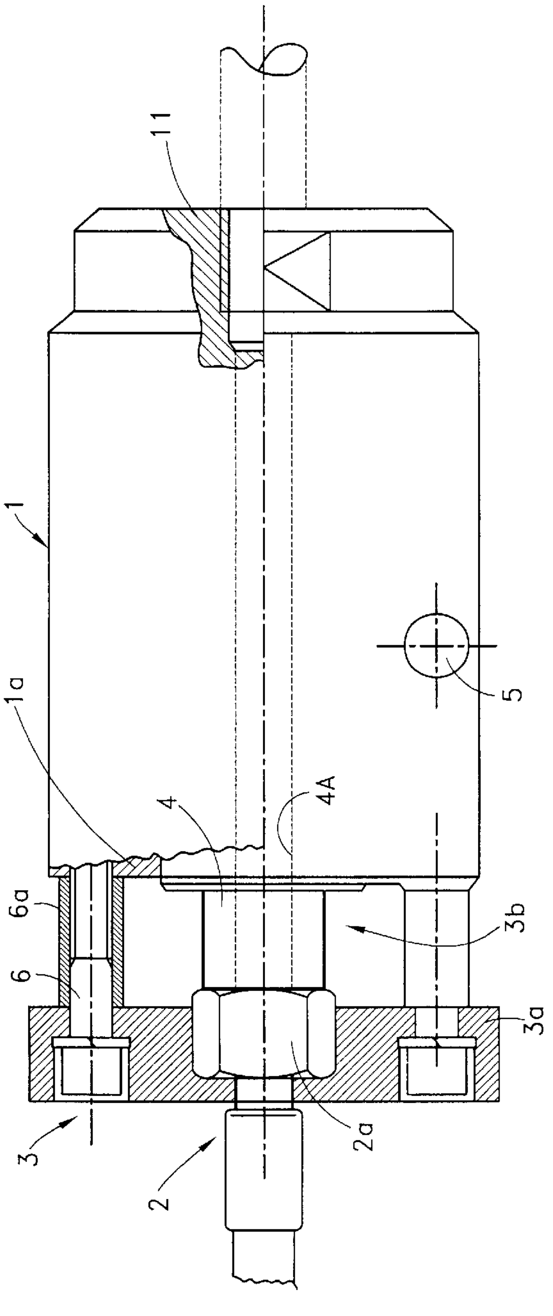
FIGS. 1*a* and 1*b* show a connector adapter is side views turned through 90°, which is fitted and connected to a mating connector by sideways introduction.

A connector adapter 1 is shown in FIG. 1*a* in side views turned through 90° and partially in half section, which is connected to a mating connector 2 shown only schematically, namely a hose extending to the left with a union nut 2*a*. This mating connector 2 can however equally be formed by an eye union 2*b* or a flange 2*c* for example, as is shown in FIG. 2. As essential components the connector adapter 1 has a housing 1*a* of sleeve form (e.g., also FIGS. 3 and 4) and an embracing holder 3, described in more detail below, which engages round the end of the mating connector 2, namely the union nut 2*a* here, like a clamp.

Figure 1B:
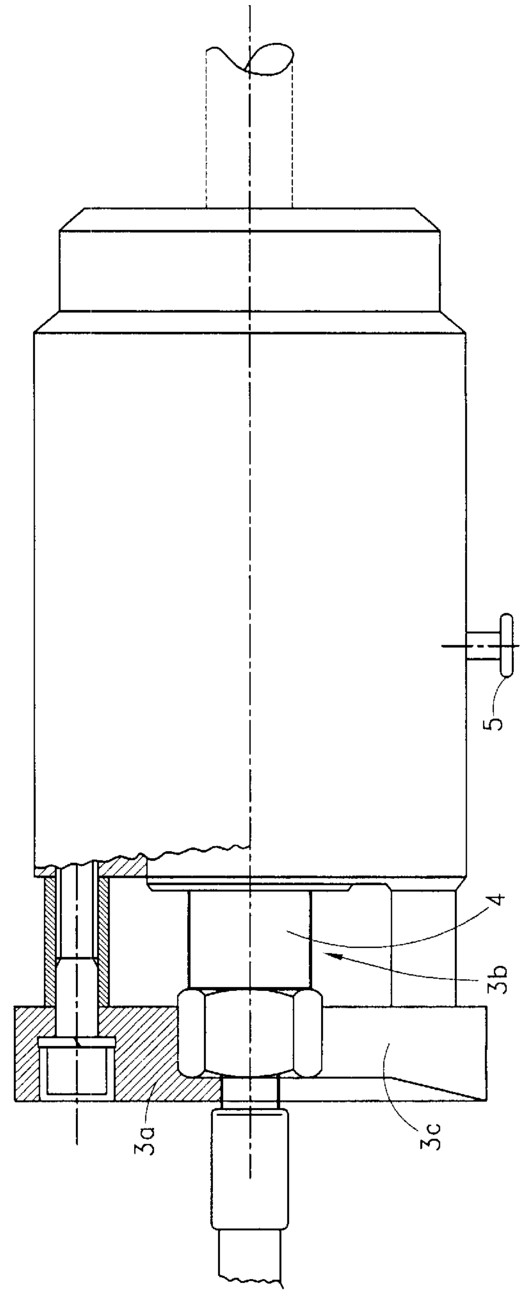

In this embodiment of the embracing holder 3 according to FIG. 1*b*, the downwardly facing side of the embracing holder 3 is made open by means of a slot-like recess 3*c*, so that the connector adapter 1 can be fitted on to or slipped over the mating connector 2 in simple manner, here from the upper side. The union nut 2*a* is adjoined on the left by a backing plate 3*a* and on the right by the components 4 to 6, described below, mounted on or in the housing 1*a*, namely a connector piston sleeve 4 matched to the mating connector 2, and actuating device 5 and the fixing of the backing plate 3*a* in the form of a plurality of screws 6.

Figure 2A:
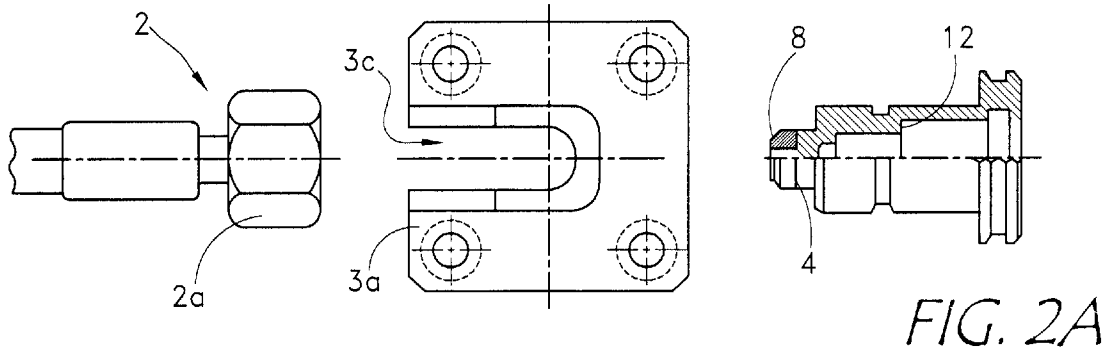
FIGS. 2*a*–2*d* show a schematic general representation of the front end of the connector adapter according to FIG. 1 with different backing plates for matching the mating connectors respectively employed, wherein several alternatives of the mating connector and associated embracing holders and connector piston sleeves are shown.
Figure 2B:
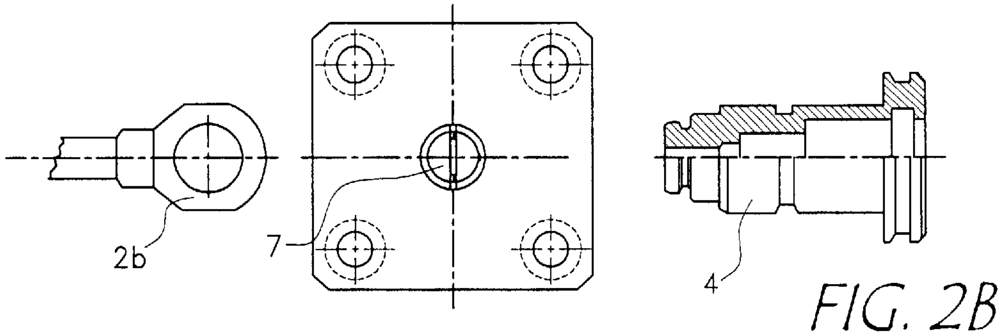
Figure 2C:
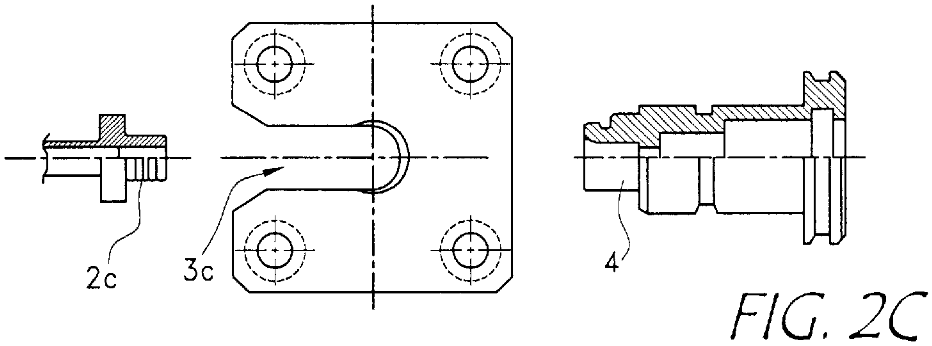
Figure 2D:
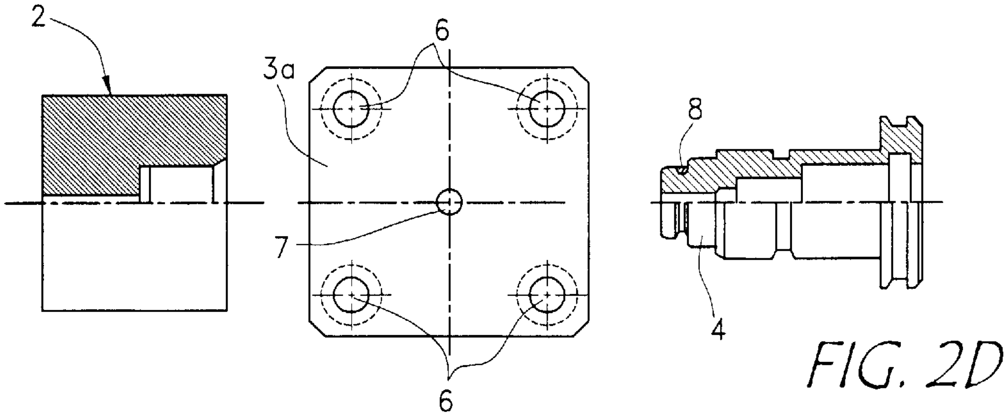
Figure 3A:
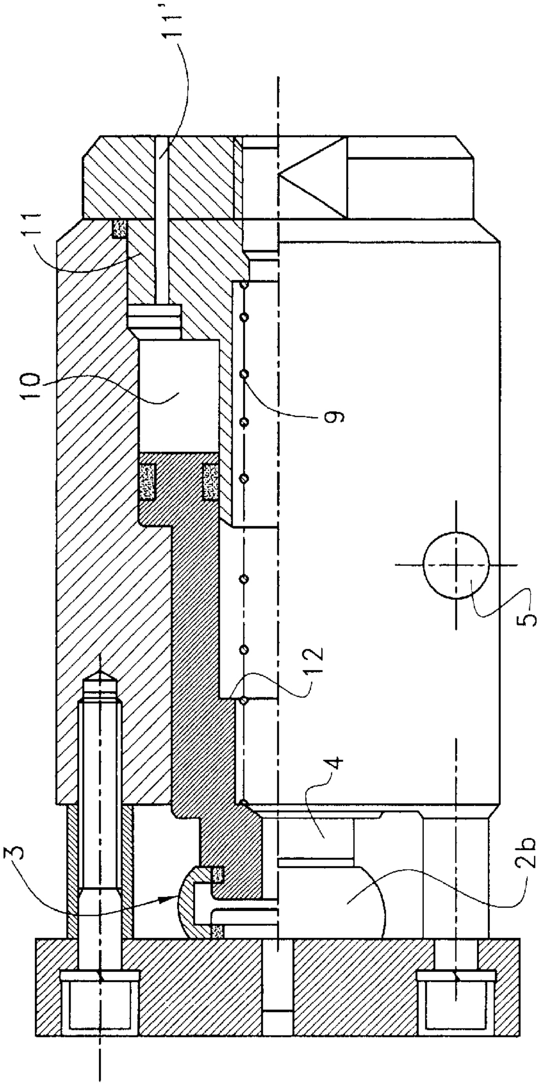
FIGS. 3*a* and 3*b* show a half sectional view of the connector adapter (shown turned through 90° as in FIG. 1) for a mating connector customary in hydraulic lines, in the connected position and in the released position.
Figure 3B:
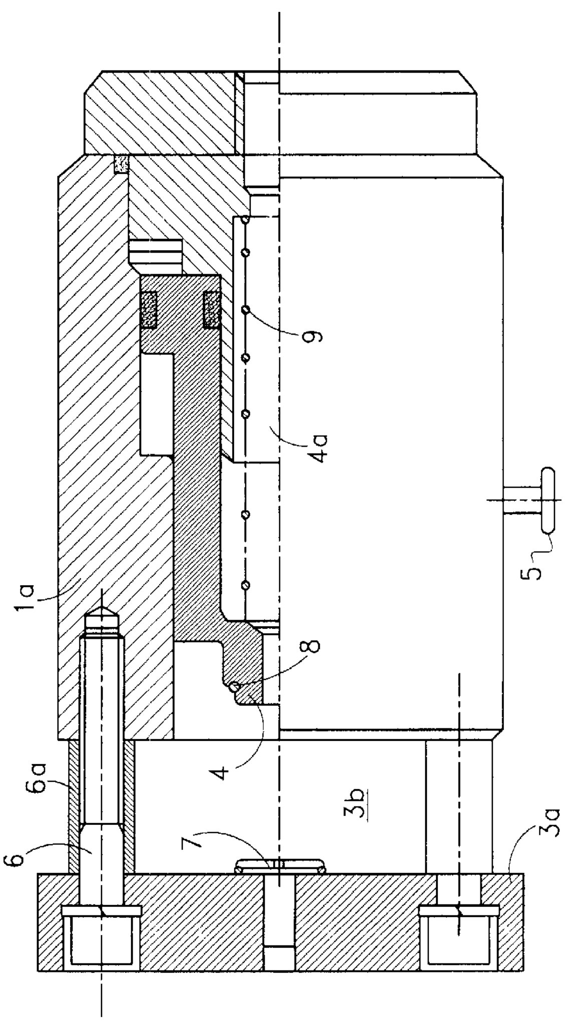

According to the embodiment of FIGS. 2*a*–2*d*, the mating connector 2 can be surrounded by the embracing holder 3 on all sides, apart from the side insertion or introduction to theslot-like recess 3*c*, between the screws 6, so that a receiving space 3*b* for the mating connector 2 is formed in the embracing holder 3, in which the connector piston sleeve 4 is axially movable for disengagement and for sealing connection, as is made clear in the two positions in FIGS. 3*a* and 3*b*.

The end of the connector piston sleeve 4, with a centrally extending fluid passage 4*a*, in the receiving space 3*b*, here on the left, can be moved axially to make the connection. The end of the fluid passage 4*a* here facing to the right can be connected by an end plug 11 screwed into the housing 1*a* to a test or filling hose indicated in broken lines, so that the end of the connector piston sleeve 4 here facing to the left lies sealed by one or more seals 8 (e.g., FIGS. 2*a* and 2*d*) against the mating connector 2 in the connected position.

The axial movement of the connector piston sleeve 4 is effected by means of an actuating device 5, here in the form of a pin projecting to the side, for locking or releasing the springloaded connector piston sleeve 4, whereby the latter will here move to the left to the receiving space 3*b* on actuation. An eccentric actuator or vacuum/pressure assistance by means of a pressure chamber 10 can be provided for improved operability (e.g., FIGS. 3*a* and 4). The connector piston sleeve 4 is guided precisely within the housing 1*a* and on the end plug 11 extended axially inwards, so that it moves like a piston in the axial direction towards the backing plate 3*a* or away therefrom.

The embracing holder 3 preferably has a plurality of fixing screws 6 on its end or on the backing plate 3*a*, with spacer sleeves 6*a* and a central coding or indexing stud 7, so that predetermined identifications between the connector adapter 1 and the mating connector 2 are facilitated. The test pressure to be applied to the mating connector 2 concerned can also be predetermined by this for example. The indexing stud 7 shown in, e.g., FIGS. 2*b*, 2*d* and 3*b* is preferably screwed on to the backing plate 3*a* of the embracing holder 3, in order to be changed on its exchange or separately.

On this engagement side of the embracing holder 3 there are provided a plurality of screws 6, each in a corner region, so that the receiving space 3*b* of the embracing holder 3 can thereby be formed in the centre. It should be noted that the fixing screws 6 screwed into the housing 1*a* can be adjusted to a specific range of length, if desired with interchange of the spacer sleeves 6*a*, so that a reliable and tight abutment of the connector piston sleeve 4 on the test part or mating connector 2, e.g., eye unions 2*b* of different widths, can be ensured in conjunction with the indexing stud 7, even at very high test pressures.

Several kinds of connection of the connector adapter 1 are shown in FIGS. 2*a*–2*d* in order to make clear the high variability of this modular construction. As can be seen from this, in comparison with the embodiment shown in FIGS. 1*a* and 1*b* with a union nut 2*a* and slot-formed recess 3*c* matched thereto in the backing plate 3*a*, a number of combinations are possible with the same basic structure of the housing 1*a*, while the connector piston sleeve 4 also can be matched to the mating connector 2 currently to be tested by quick exchange (after releasing the end plug 11). The exchange of the connector piston sleeve 4 is however in general only necessary when the sealing engagement on the current mating connector 2, 2*a*, 2*b* or 2*c* is to be markedly different. However it can also be only the front end with the seal or seals 8 which is exchanged, in order to match the connector adapter 1 to different diameters of the mating connector 2.

The housing 1*a* with the actuating device 5, the screws 6 and the screwed in closure plug 11 as the base module always remain the same, as well as the attachment dimensions of the interchangeable parts, namely the bore pattern in the base plate 3*a* and the outer diameter of the connector piston sleeve 4 mounted axially in the housing 1*a*. A substantial simplification in the manufacture of the components and assembly results from this.

The axial movement of the connector piston sleeve 4 is made clear in FIGS. 3*a* and 3*b*, being initiated by actuation and optionally by pressure assistance. A control pressure can be applied to the pressure chamber 10 through a bore 11', so that, on actuation via the actuating device 5, the connector piston sleeve 4 shown here in black retracts from the embracing holder 3 into the housing 1*a* (FIG. 3*b*).

When the control pressure (here vacuum) is switched off, the connector piston sleeve 4 can move to the left into the frame-like receiving space 3*b* of the embracing holder 3 under the bias of a spring 9 arranged in the fluid passage 4*a*, while at the same time amplification of the force of application of the connector piston sleeve 4 on to the mating connector 2 can be achieved through an annular shoulder 12 of enlarged diameter (FIG. 2*a*), when the fluid passage 4*a* of the connector adapter 1 is subjected to a test pressure. Instead of in addition to the spring 9, the pressure chamber 10 can also be formed as a double-acting cylinder, so as to serve for both the pressing movement and the retracting movement of the connector piston sleeve 4.

In the connected position shown in FIG. 3*a*, the connector piston sleeve 4 together with the sealing ring 8 on the end bears against the mating connector 2, while an additional force of application in the axial direction results from the greater diameter of the annular shoulder 12 around the spring 9. The pressure chamber 10 is thus not absolutely essential, since the force of application of the test medium in conjunction with the pressure assistance on the annular shoulder 12 during the test process is enough for reliable sealing on the mating connector 2. A non-return valve is preferably also integrated in the connector piston sleeve 4.

The sealing ring 8 is fitted in or on the front end shoulder of the connector piston sleeve 4 while such a sealing ring is also provided on the indexing stud 7 of the backing plate 3*a*, in order to seal the eye union 2*b* fixed therebetween on both sides. The sealing ring 8 on the front part of the connector piston sleeve 4 is preferably fixed interchangeably, especially being screwed on with a ring, as is indicated in FIG. 2*a*, so that matching to different mating connectors 2 can be effected in a simple way.

It can be seen from a comparison between FIGS. 1*a*, 1*b* and 3*a*, 3*b*, with basically the same structure of the connector adapter 1, that the mating connectors 2*a* and 2*b* are received tightly in the receiving space 3*b* of the embracing holder 3, so that a very stable structure can be obtained. In addition the connector adapter 1 can be taken apart in a simple way, in that the fixing screws 6 and optionally the spacer sleeves 6*a* are released, in order to fit the appropriate backing plate 3*a* (middle column in FIGS. 2*a*–2*d*).

The connector piston sleeve 4 can also be exchanged to adapt to the current mating connector 2, insofar as the simpler exchange at the front end does not suffice, since the end plug 11 can also be released simply and quickly from the housing 1*a*, in order to facilitate disassembly —and in converse manner in the production of a simple, inexpensive assembly—in order to adapt to the current mating connector 2 to be tested (e.g., even a relatively large valve slide shown in FIG. 2*d*).

A feature in common to all the alternative embodiments is that the embracing holder 3 is largely closed by the backing plate 3*a* with like connecting dimensions for the fixing screws 6, so that the embracing holder 3 is fitted closely over the mating connector 2.

Great strength of the embracing holder 3 results from this, so that this structure closed like a frame is especially advantageous for many applications with hose lines with union nuts 2*a*, with additional axial fixing in the slot-shaped recess 3*c*.

Figure 4:
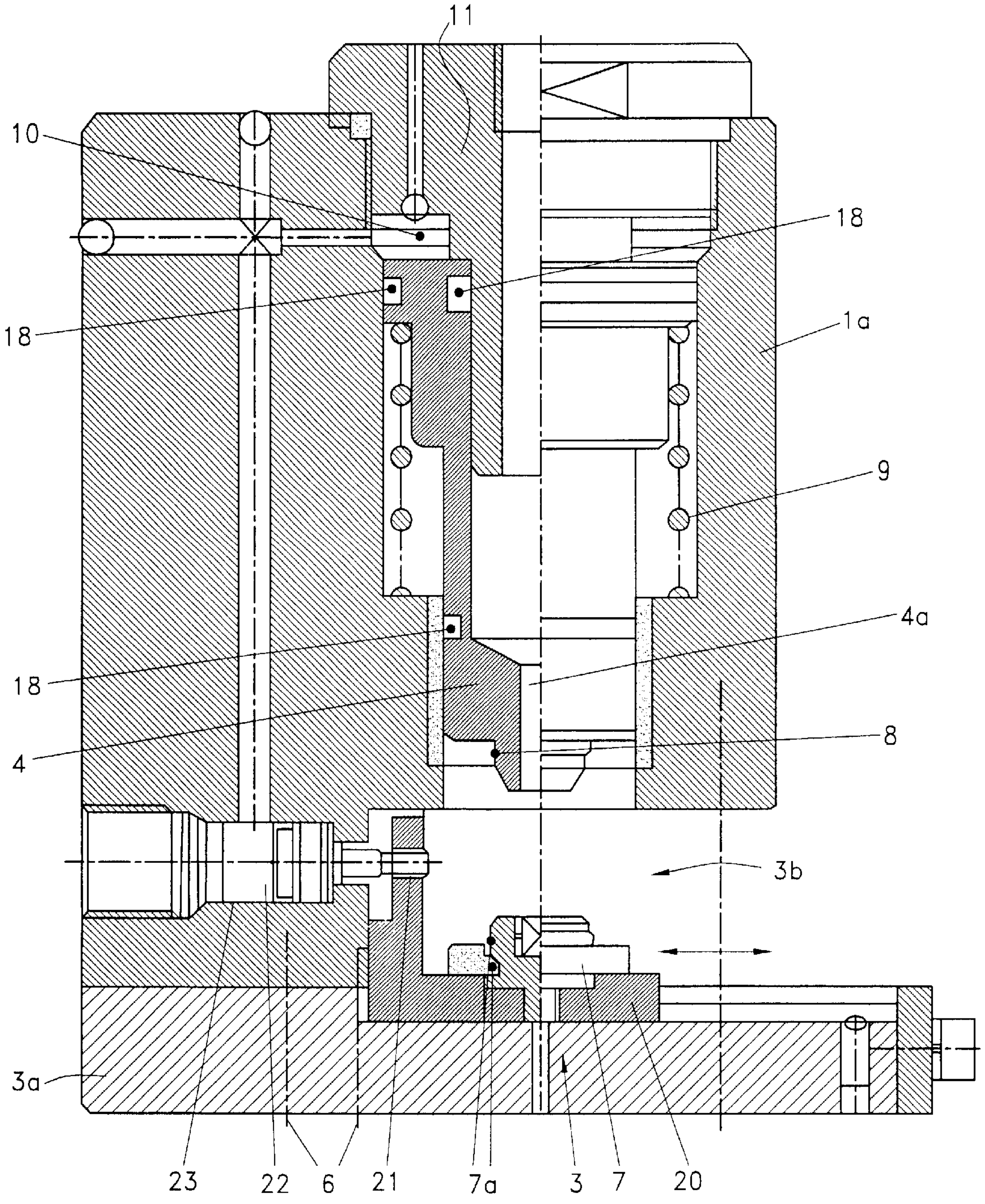
FIG. 4 shows a design of the connector adapter on a stand with pneumatic actuation through a control valve.

A design of the connector adapter on a stand is shown in FIG. 4, wherein the components with the same function as in FIGS. 1 to 3 are given the same reference numerals. This applies in particular to the fixed housing 1*a*, in which the connector piston sleeve 4 with the fluid passage 4*a* is axially movable. The connector piston sleeve 4 is biased upwardly for this by a spring 9 here lying on the outside. The embracing holder 3 in the form of a backing plate 3*a* here disposed underneath is again fixed to the housing 1*a* so as to be rapidly interchangeable, by means of screws 6 indicated in broken lines. Adaptation can be effected thereby, depending on the mating connector to be tested. In addition there is again a coding or indexing stud 7, which is also provided with seals 7*a*. This indexing stud 7 is mounted on a slide 20, which has an actuating pin 21. In the actuating function illustrated here, this actuating pin 21 acts on a control valve 22, which is fitted in a corresponding bore 23. In this position the pressure chamber 10 above the connector piston sleeve is pressurised, so that the connector piston sleeve 4 extends, with the front seal 8 on the mating connector 2. The connector piston sleeve 4 is provided with a plurality of seals 18 for this. The connection position is produced in a simple way by this partly automated design of the connector adapter, at the same time as the mating connector 2 on the slide 20 is inserted.

What is claimed is:

1. A connector adapter, comprising:

an embracing holder;

a connector piston sleeve, which is axially movable relative to the embracing holder by means of an actuating device and bears against a mating connector in sealed manner in a connected position; and a backing plate supporting the mating connector and interchangeably attached to the connector adapter.

2. The connector adapter of claim 1, wherein the connector piston sleeve is axially movable within a receiving space in the embracing holder bounded at one end by the backing plate.

3. The connector adapter of claim 1, wherein the connector piston sleeve is interchangeable to adapt to a current mating connector.

4. The connector adapter of claim 1, wherein the connector piston sleeve has a central and axially extending fluid passage.

5. The connector adapter of claim 1, wherein the connector piston sleeve is acted on by at least one of a spring and a pressure chamber of a single or double-acting cylinder within a housing.

6. The connector adapter of claim 1, wherein the mating connector has a union nut which can be introduced sideways into a slot-like recess in the backing plate.

7. The connector adapter of claim 1, wherein the mating connector has an eye union which can be inserted sideways into the embracing holder.

8. The connector adapter of claim 1, therein the mating connector has a flange which can be fitted into the backing plate of the embracing holder.

9. The connector adapter of claim 1, wherein the backing plate engages the mating connector closely in an axial direction and wherein an axial spacing can be adjusted by spacer sleeves.

10. The connector adapter of claim 1, wherein at least one sealing ring is provided between the connector piston sleeve and the backing plate for face abutment against the mating connector.

11. The connector adapter of claim 1, wherein a non-return valve is integrated in the connector piston sleeve.

12. The connector adapter of claim 1, wherein the connector piston sleeve has an annular shoulder for supplementing a force of application through an applied fluid, having a greater diameter than that which a front part of the connector piston sleeve applied to the mating connector has.

13. A connector adapter, comprising:

an embracing holder;

a connector piston sleeve, which is axially movable relative to the embracing holder by means of an actuating device and bears against a mating connector in sealed manner in a connected position; and a backing plate supporting the mating connector and attached to the connector adapter, wherein the backing plate lying opposite the connector piston sleeve is fixed to a housing of the connector adapter by at least two screws.

14. A connector adapter, comprising:

an embracing holder;

a connector piston sleeve, which is axially movable relative to the embracing holder by means of an actuating device and bears against a mating connector in sealed manner in a connected position; and a backing plate supporting the mating connector and interchangeably attached to the connector adapter, wherein at least one of the backing plate and the connector piston sleeve has an indexing stud.

15. A connector adapter, comprising:

an embracing holder;

a connector piston sleeve, which is axially movable relative to the embracing holder by means of an actuating device and bears against a mating connector in sealed manner in a connected position; and a backing plate supporting the mating connector and interchangeably attached to the connector adapter, wherein a slide is arranged on the backing plate and actuates a valve in the connection position.

* * * * *

UNITED STATES PATENT AND TRADEMARK OFFICE

CERTIFICATE OF CORRECTION

PATENT NO. : 6,454,309 B1
DATED : September 24, 2002
INVENTOR(S) : Weh et al.

It is certified that error appears in the above-identified patent and that said Letters Patent is hereby corrected as shown below:

Column 5,
Line 41, please change "therein" to -- wherein --.

Signed and Sealed this

Thirteenth Day of May, 2003

JAMES E. ROGAN
*Director of the United States Patent and Trademark Office*